(12) United States Patent
Duggan et al.

(10) Patent No.: US 8,077,031 B2
(45) Date of Patent: Dec. 13, 2011

(54) POSITION LOCATING BY POLYHEDRAL MORPHING

(75) Inventors: Robert J Duggan, Strafford, NH (US); Keith A Nevish, Barrington, NH (US)

(73) Assignee: Consortium P, Inc., Rochester, NH (US)

( * ) Notice: Subject to any disclaimer, the term of this patent is extended or adjusted under 35 U.S.C. 154(b) by 239 days.

(21) Appl. No.: 12/544,493

(22) Filed: Aug. 20, 2009

(65) Prior Publication Data
US 2011/0043358 A1 Feb. 24, 2011

(51) Int. Cl.
G08B 1/08 (2006.01)
G08B 9/00 (2006.01)
G08B 21/00 (2006.01)

(52) U.S. Cl. ............ 340/539.13; 340/539.1; 340/572.1; 340/686.6; 340/286.02

(58) Field of Classification Search ............ None
See application file for complete search history.

(56) References Cited

U.S. PATENT DOCUMENTS

| 7,323,991 | B1 | 1/2008 | Eckert et al. | |
| 7,525,434 | B2 * | 4/2009 | Batra | 340/572.1 |
| 2003/0235173 | A1 * | 12/2003 | Wood | 370/338 |
| 2004/0178269 | A1 * | 9/2004 | Pradhan et al. | 235/462.13 |
| 2005/0040232 | A1 * | 2/2005 | Maloney | 235/385 |
| 2008/0061967 | A1 * | 3/2008 | Corrado | 340/539.26 |

FOREIGN PATENT DOCUMENTS

| JP | 2009-092423 A | 4/2009 |
| KR | 10-2005-0063414 A | 6/2005 |
| KR | 10-2007-0078664 A | 8/2007 |

OTHER PUBLICATIONS

PCT Search Report dated Apr. 27, 2011 of Patent Application No. PCT/US2010/046047 filed Aug. 20, 2010.

* cited by examiner

*Primary Examiner* — Julie Lieu
(74) *Attorney, Agent, or Firm* — Vern Maine & Associates

(57) ABSTRACT

Objects are located within at least one mapped field region. Environments for location tracking are mapped through a configuration setup flexibly supporting multiple objects with precision and speed. Host and Repeater devices are located at vertices of polyhedra defining spaces. Polyhedra edge lengths are defined as the modified physical distance between two devices. This morphing employs parameters measured by or input to the system. Morphed three dimensional subzones are defined within the volume of the polyhedra defined by the devices at the vertices.

16 Claims, 8 Drawing Sheets

100

SECTOR CONFIGURATION

SECTOR CONFIGURATION

GROUPS 1 - 4

GROUPS 3 & 4
ZONES 7 - 9 & A - C

3-D CONFIGURATIONS - POLYHEDRA

POSITION LOCATING BY POLYHEDRAL MORPHING

FIELD OF THE INVENTION

The invention relates to wireless object location tracking, and more particularly, to a system and method for object location and data tracking employing radio frequency identification (RFID) tags communicating with interconnected transceivers.

BACKGROUND OF THE INVENTION

Real Time Location Systems (RTLSs) track objects, typically by associated tags. They can provide Unique Device Identification (UDI) and may employ Received Signal Strength Indication (RSSI) of RF signals to calculate relative positions. For individuals, a badge is used for tracking in environments such as health-care facilities, warehouses, and other areas where location is important. Personnel badges and asset tags may include RFID, passive or active, to communicate with fixed or hand-held readers.

The Wi-Fi standard (802.11) has been used as the communications protocol for RTLS to interface with the tags and determine their locations. Some tags are intended to, but do not successfully, scale to meet the needs of large enterprises and are limited to small-scale installations. Accuracy in the field can be insufficient to support business needs. For example, accuracy can be hampered by the environment and the location of fixed stations. Some systems are difficult to learn and use, lacking a visual component. Also, the speed of location or identification can be unacceptable. It may take several minutes before some tags transmit and have their location updated. For some, the time interval can be decreased, but a result is unacceptable tag battery life.

These systems monitor people and items with varying levels of accuracy. A need exists for the ability to economically and accurately track assets and their attributes in a scalable system suitable to multiple environments including hospital facilities.

SUMMARY OF THE INVENTION

Embodiments of the present invention include wireless tags within a configuration of Hosts and Repeaters. These Hosts and Repeaters are organized into Sectors and Zones. Location is determined between Location and Data Management Services. In general, the Location Service determines a Tag's Sector and Zone location. It sends this to the Data Management Service via the Tag Location Message along with the field strength readings for the Host and the two Repeaters that make up the Zone. The Location Service listens for network messages and then groups them based on TagID. It sorts them in order of strongest signal strength to weakest. It then traverses the list to find the first Zone match within the Sector (the Zone with the strongest readings). Once this is done, it sends the Tag Location Message on to the Data Management Service. The Data Management Service processes readings from the Tags and provides the tag locations to a project management application to support business functions.

Embodiments include a system for object location tracking within a field region comprising at least one tag associated with an object; at least one host, wherein the at least one host determines attributes of field generated by at least one of the at least one tag and the at least one host, whereby location of the at least one tag in the field region is determined from the attributes. There are other embodiments further comprising at least one repeater, wherein at least one of the at least one repeater and the at least one host determines attributes of field generated by at least one of the at least one tag, the at least one host, and the at least one repeater, and wherein the at least one repeater is in communication with the at least one host, whereby location of the at least one tag in the field region is determined from the attributes. For additional embodiments, the location determination comprises three spatial dimensions. In another embodiment, the field region comprises at least one sector comprising at least one group, and the at least one group comprises at least one zone comprising at least one subzone. In yet other embodiments, object location determination comprises rules, wherein the rules comprise overrides to adapt to environment and object attributes, and the location determination comprises assigning a tag to a specific location when the tag is associated with a host, wherein the host is configured as a proximity device. Other embodiments provide that communication of environment attributes and object attributes comprises messages and the messages comprise at least one of: tag location, battery voltage, ambient temperature, RF strength from host, unplaced tag, and tag proximity. In additional embodiments, the object location tracking comprises mapping the field region, and the mapping comprises field parameters. In yet further embodiments, mapped field parameters comprise tag to host Received Signal Strength Indication (RSSI) and host to tag RSSI, an asset table is updated by asset tag appearance, and object tracking comprises thresholds whereby efficiency is increased.

Embodiments also include a method for tracking objects comprising the steps of measuring field attributes of a region; identifying at least one object from the measured attributes; and determining at least a location of the object from the measured attributes. In another embodiment, field regions are mapped to define locations. For one embodiment, the steps further comprise calibrating to determine the attributes of the field of the region whereby the field of the region is mapped for attributes. In others, the attributes comprise RF field attributes for a location, location resolution is configurable, providing enhanced accuracy and speed, and the at least one object is sorted by object parameters. One other embodiment provides that the step of determining at least a location of the object comprises a configurable sleep time defining message check frequency whereby efficiency is increased.

A further embodiment includes a system for object tracking within a field region comprising at least one object comprising at least one tag; at least one host; and at least one repeater, wherein the at least one repeater determines attributes of a field generated by the at least one object comprising at least one tag and is in communication with the at least one host, whereby a three-dimensional spatial location of the at least one object in the field region is determined from the attributes, wherein false location messages are ignored for the tags not in attribute database, field mapping attributes comprise Extensible Markup Language (XML) documents, and the object tracking comprises out of network information, purge time, and configurable sleep time defining message check frequency whereby efficiency is increased.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Infrastructure components of the system comprise devices configured to define one or more Sectors. Devices can be categorized into hosts and repeaters. A host performs the functions of communicating with tags, synchronizing repeaters, and bridging protocols between the tags and the location server. A repeater is a passive listening device that repeats data that is being sent from a tag to the host by bridging the protocol. Regarding Sectors, a Sector is divided into Groups and each Group is divided into Zones. Zones are subsequently divided into Subzones. Subzones are characterized by relative signal strengths from a transmitting tag. Initial component layout explanations are given in two dimensions; this is then extended to three dimensions. Details on each follow.

Figure 1:
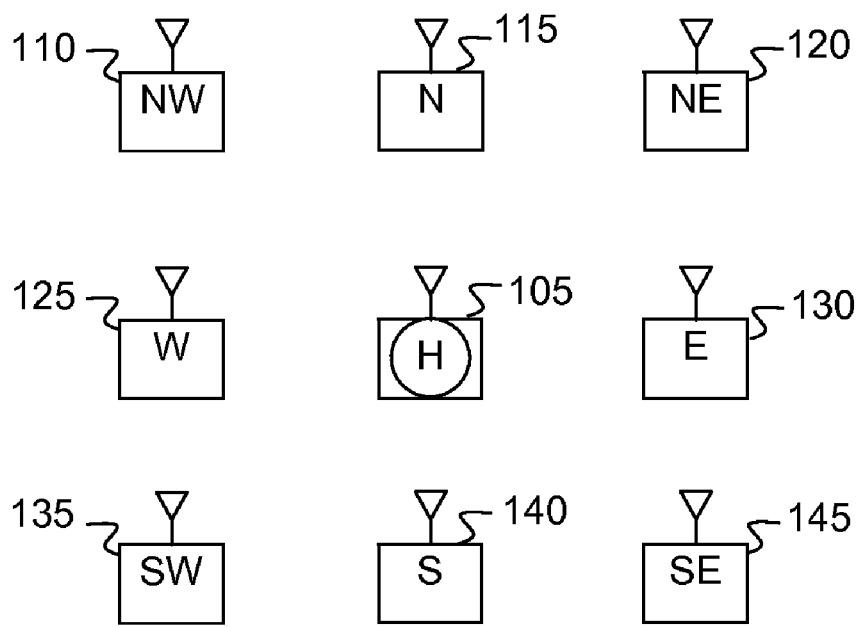
FIG. 1 is a depiction of a functional Sector layout of Host and Listening Repeaters configured in accordance with an embodiment.

FIG. 1 is a functional layout depicting a single Sector 100 comprising Host and Listening Repeaters configured in accordance with an embodiment. A Sector consists of a Host Device 105 and between two and eight Repeaters. In this embodiment, the Host is physically positioned generally in the center of eight Repeaters. Repeaters are identified by compass points for convenience and do not necessarily indicate actual orientations. For explanation purposes, Repeaters are designated Northwest (NW) 110, North (N) 115, Northeast (NE) 120, West (W) 125, East (E) 130, Southwest (SW) 135, South (S) 140, and Southeast (SE) 145. Note that this alignment nomenclature is not employed once extended into three dimensions.

Figure 2:
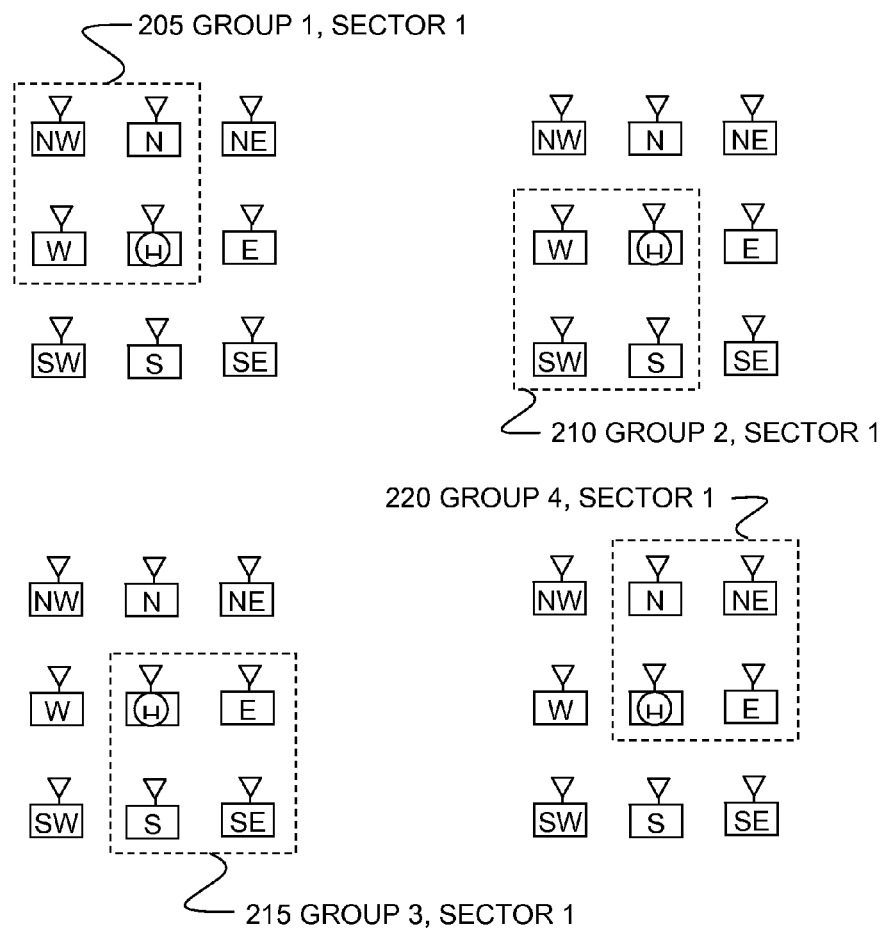
FIG. 2 is a depiction of a configuration of Groups of Host and Listening Repeaters in accordance with one embodiment.

FIG. 2 shows associations 200 of a Host and Repeaters within a Sector to designate Groups for an embodiment. A group comprises three Repeaters and a Host. In this embodiment, a complete Sector contains four groupings groups of Hosts and Repeaters. For nomenclature purposes, Host, NW, N, and W Repeaters comprise Group 1 205. Host, SW, S, and W Repeaters comprise Group 2 210. Host, SE, S, and E Repeaters comprise Group 3 215. Host, NE, N, and E Repeaters comprise Group 4 220. Each Group depiction is for the same Sector, Sector 1.

Figure 3:
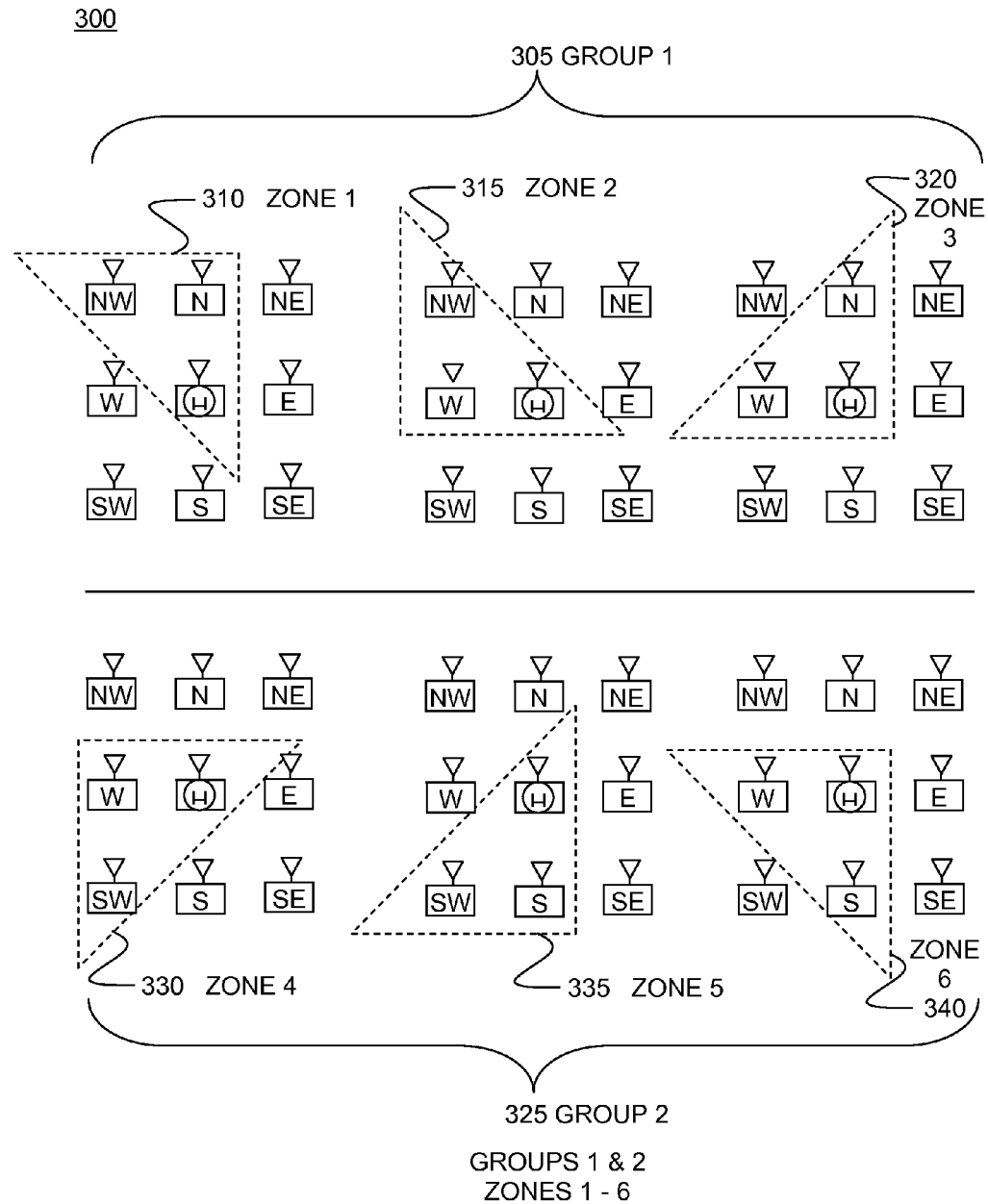
FIG. 3 is a depiction of a configuration of Zones for Groups 1 and 2 in accordance with one embodiment.

FIG. 3 depicts Zones 300 within Groups 1 and 2 of a Sector for an embodiment. A Zone comprises two Repeaters and a Host, resulting in three Zones per Group. Group 1 305 comprises the three Zones: Zone 1 310 including Host (H), N & NW, Zone 2 315 including H, NW & W, and Zone 3 320 including H, N & W. Group 2 325 comprises the three Zones: Zone 4 330 including H, W & SW, Zone 5 335 including H, SW & S, and Zone 6 340 including H, W & S.

Figure 4:
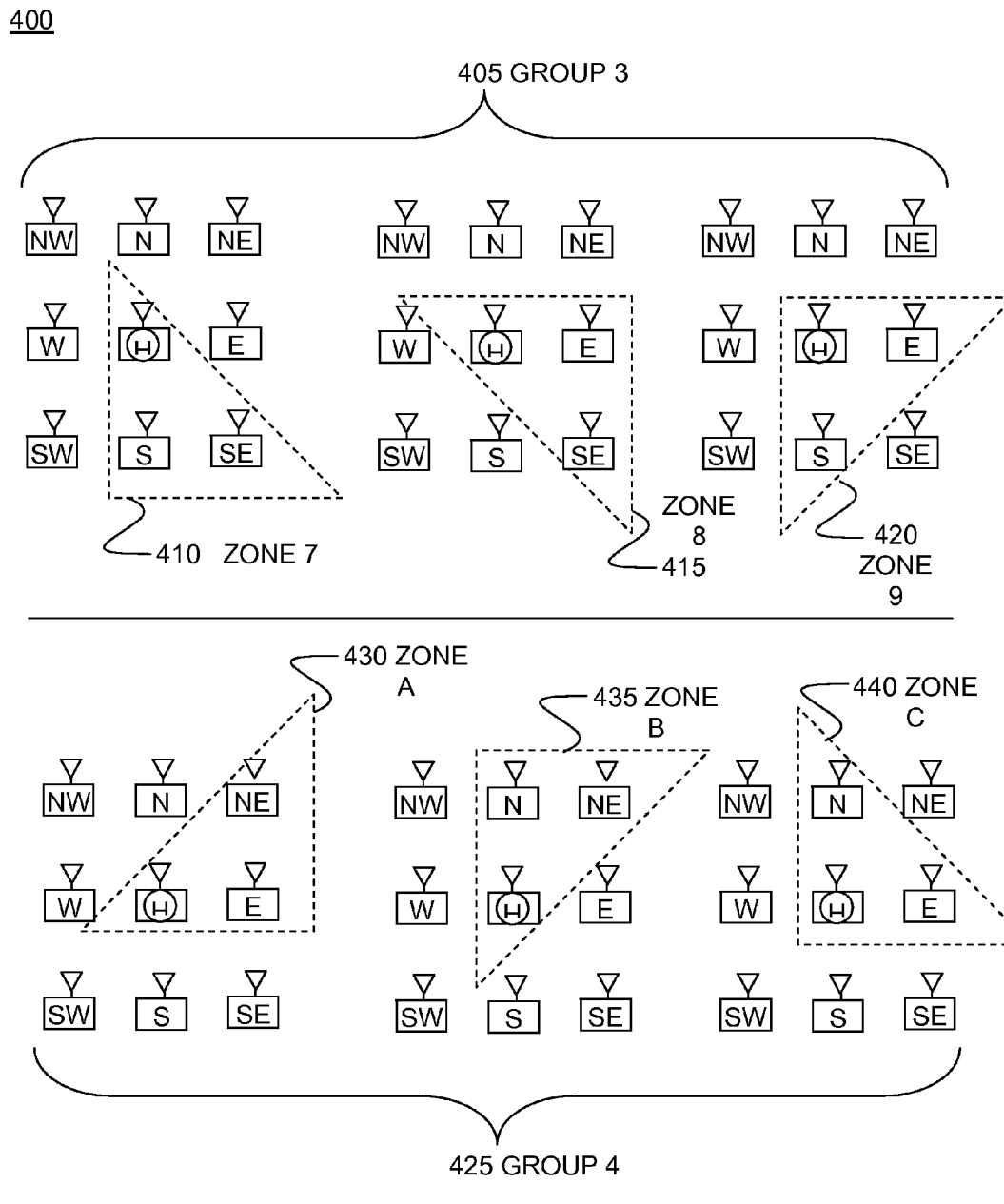
FIG. 4 is a depiction of a configuration of Zones for Groups 3 and 4 in accordance with one embodiment.

FIG. 4 depicts Zones 400 within Groups 3 and 4 of a Sector for an embodiment. Group 3 405 comprises Zone 7 410 including H, S & SE, Zone 8 415 including H, SE & E, and Zone 9 420 including H, S & E. Group 4 425 comprises Zone A 430 including H, E & NE, Zone B 435 including H, N & NE, and Zone C 440 including H, E & N. Table 1 summarizes all Zones for the Sector of this embodiment.

TABLE 1

| Hosts and Repeaters | | | |
|---|---|---|---|
| Group | Zone | Repeater 1 | Repeater 2 |
| 1 | 1 | H | N | NW |
| | 2 | H | NW | W |
| | 3 | H | N | W |
| 2 | 4 | H | W | SW |
| | 5 | H | SW | S |
| | 6 | H | W | S |
| 3 | 7 | H | S | SE |
| | 8 | H | SE | S |
| | 9 | H | S | E |
| 4 | A | H | E | NE |
| | B | H | N | NE |
| | C | H | E | N |
| 5 | D | S | E | SE |
| | E | S | W | SW |
| | F | N | W | NW |
| | G | N | E | NE |

This particular embodiment uses a fixed Host in the center, but Hosts can be dynamically selected to make up any geometric shape. As an example, in the table above for Group 5, triangles are defined without calling out a Host. This is done by the system software selecting a Host either through initial setup or dynamically. Nor do three devices located next to each other have to be selected. Embodiments could select NW, SE, SW, and assign a Host to one of them. This is relevant also when working in three dimensions. In three dimensions, triangles are exchanged for multifaceted polyhedra. Simple triangles are also left when considering spatial models and adding virtual tag readings that warp the sectors, zones, and subzones. Virtual tags have the effect of pushing or pulling on the sides of the geometries defined by Hosts and/or Repeaters to encompass areas where the electromagnetic field is distorted.

Figure 5:
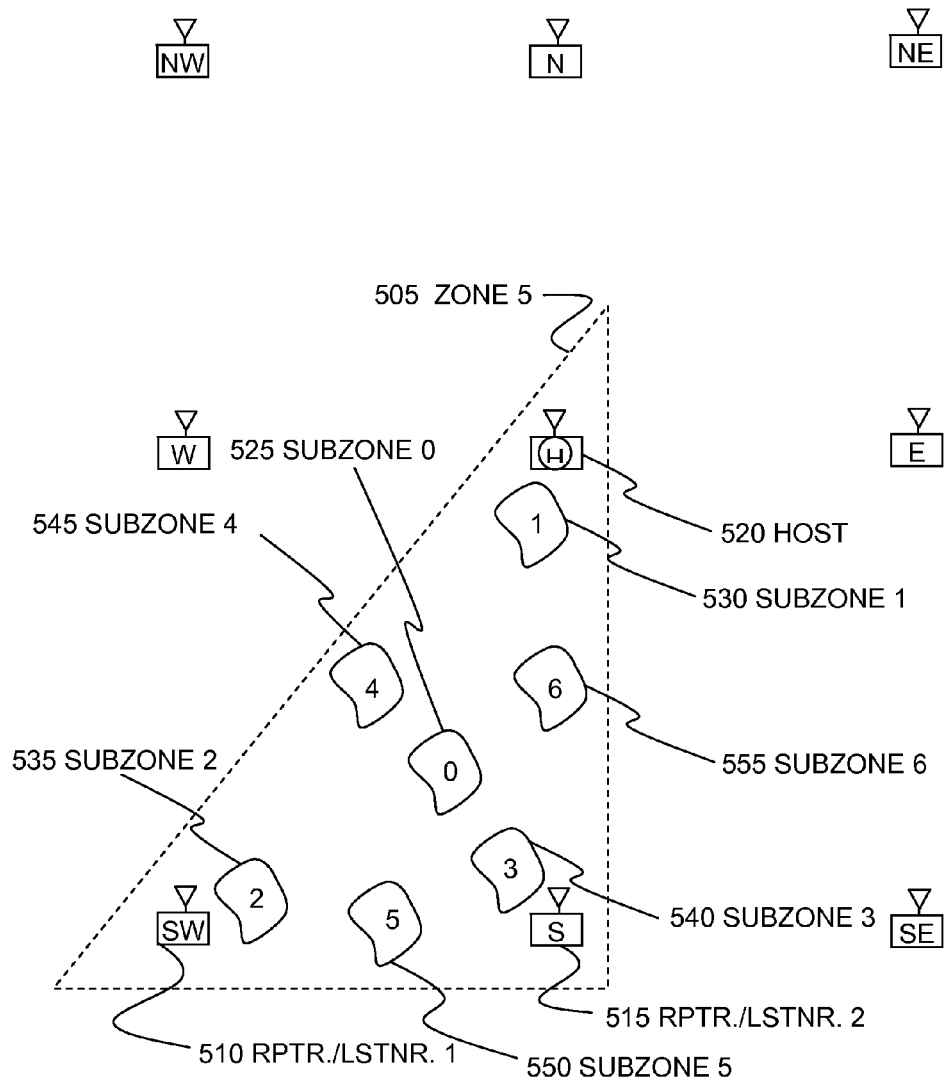
FIG. 5 is a depiction of a configuration of Subzones for Zone 5 in accordance with one embodiment.

FIG. 5 identifies Subzones 500 within a Zone for an embodiment. Once the Zone is determined for a Tag's location, received signal strengths at each of the three devices (Host and Repeaters) of the Zone are compared. In this embodiment, the Zone is divided into seven subzones. It can be divided it into more or fewer Subzones. The number of Subzones can be a setup and configuration option. Each Zone listed above contains the Host and two Repeaters in the Sector. The order listed in Table 1 is important for nomenclature purposes. When read from left to right, the devices in each Zone are referred to as Host, Repeater 1 and Repeater 2 for that Zone. Zone 5 505 includes Host 520, SW Repeater 510, and S Repeater 515. For Zone 5 505, Repeater 1 is South West (SW) Repeater 510 for the Sector. Repeater 2 for Zone 5 is South (S) Repeater 515 for the Sector. The Figure indicates only general areas for each Subzone, not necessarily specific points or locations. The common parameter definitions for the seven Subzones within each Zone are defined as follows, using Zone 5 as an example. For Subzone 0 525, all 3 signals are approximately equal. For Subzone 1 530, the Host 520 signal is the strongest. For Subzone 2 535, Repeater 1 510 signal is the strongest. For Subzone 3 540, Repeater 2 515 signal is the strongest. For Subzone 4 545, Host 520 and Repeater 1 510 signals are approximately equal and stronger than Repeater 2 515 signal. For Subzone 5 550, Repeater 1 510 and Repeater 2 515 signals are approximately equal and stronger than the Host 520 signal. And for Subzone 6 555, Host 520 and Repeater 2 515 signals are approximately equal and stronger than Repeater 1 510 signal. Seven Subzones for each of twelve Zones in a Sector provides eighty four Subzones per Sector. In this embodiment, signal strength is the observed parameter. Other parameters can be used such as intensity or phase shift.

Figure 6:
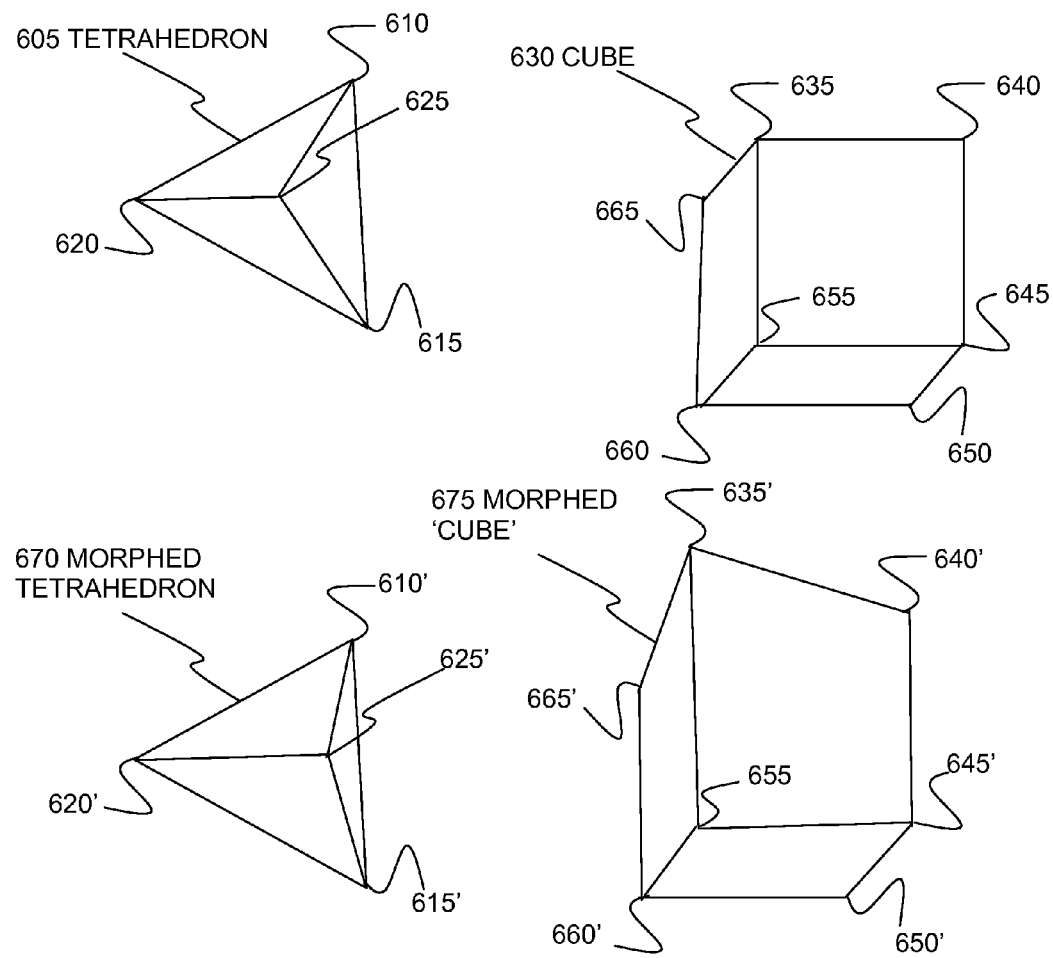
FIG. 6 is a depiction of a polyhedral morphing three dimensional relationships in accordance with one embodiment.

FIG. 6 depicts an embodiment of three-dimensional volume extensions 600 for the two-dimensional descriptions of FIGS. 1 through 5. Relationships between the two-dimensional concepts presented and their three-dimensional counterparts are described next. Mathematically, polyhedra are defined as a set in Euclidean space of any dimensional n having flat sides. Geometrically, a polyhedron is a three-dimensional shape comprised of planar polygonal faces. Faces meet at their edges. Edges are straight line segments. These line segments meet at vertices. Examples of polyhedra include tetrahedra 605 and 670 (4 vertices and 4 triangular faces), pentahedra (not shown) (5 vertices and 5 faces—a square pyramid), and cubes 630 (8 vertices and 6 square faces). Edges of polyhedra may be equal in symmetrical polyhedra, but are not necessarily. In this application, Host and Repeater devices are located at the vertices of polyhedra. Four devices define a tetrahedron, five define a pentahedron, and six may define a cube. Edge lengths may be varied while maintaining the same number of vertices and the same type of polyhedron. Edge lengths can be defined as the physical distance between two devices. This can be measured and stored in the system. Mathematically, edge values can depict signal strength as an example. They can be varied by parameters applying to adjacent or just related devices or vertices. This can be thought of as morphing or transitioning from one set of edge values to another.

Using the example of FIG. 6, original tetrahedron 605 comprises vertices 610, 615, 620 and 625. Original cube 630 comprises vertices 635, 640, 645, 650, 655, 660 and 665 (plus one not visible). Morphed tetrahedron 670 and morphed cube 675 now have different edge lengths between vertices, designated by prime ('). Morphed tetrahedron 670 comprises vertices 610', 615', 620' and 625'. Morphed cube 665 comprises vertices 635', 640', 645', 650', 655', 660' and 665' (plus one not visible). This represents varying relationships between vertices or devices. It could be measured, calculated, manually entered, or some combination. For example, electromagnetic field distortions can be represented this way. A metallic obstruction may attenuate signal strengths as if a device were located at a greater distance than it actually is. This can be accounted for by a morphing adjustment. In this way, morphed three dimensional subzones are defined within the volume of the polyhedra defined by the devices at the vertices. Enhanced accuracy in real-world environments is the result.

Figure 7:
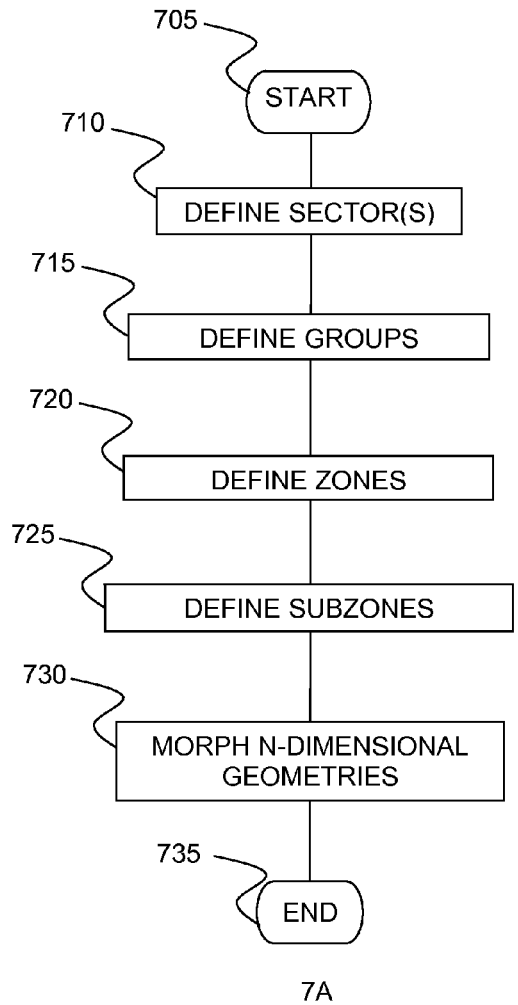
FIG. 7 is a flow chart of Tag Subzone determination steps configured in accordance with one embodiment.
Figure 7:
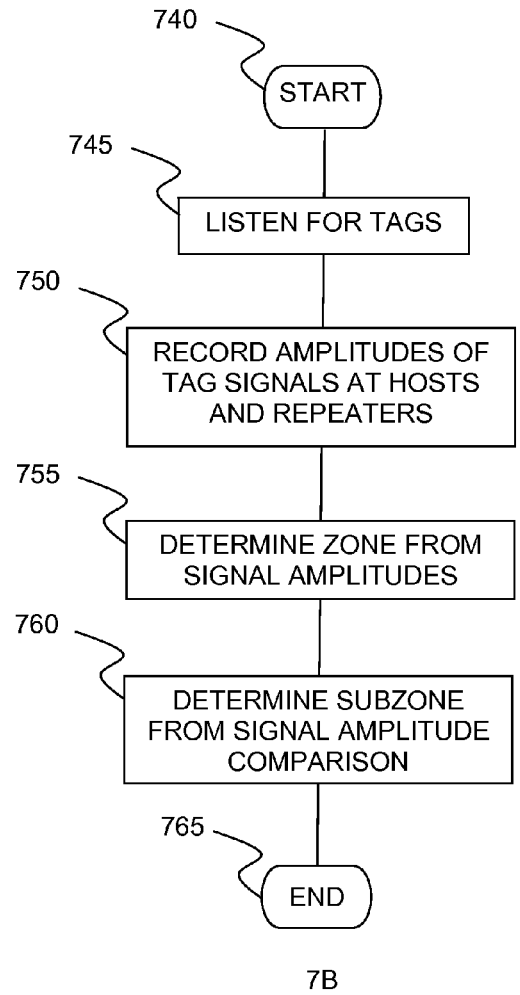

FIG. 7 depicts flow charts 700 of embodiments of system operation. FIG. 7A is a flow chart of the steps to configure a system setup and FIG. 7B is a tag location flow chart. FIG. 7A is a flow chart of the steps to configure a system for object location and tracking. From start 705, Host and Repeaters are configured to define one or more Sectors 710. Groups within Sectors are defined 715. Zones within Groups are defined 720. Subzones within Zones are defined 725. Geometries defined by Sectors, Groups, Zones and Subzones are morphed into n-dimensional geometries 730, ending 735 the steps of system configuration. FIG. 7B is a flow chart of the steps to locate a tag in a subzone. From Start 740, the Host and Repeaters listen for signals from Tags 745. The amplitude of the Tag signals received at Hosts and Repeater is recorded 750. Based on these signals, a Zone is determined 755. From a comparison of the received signal strengths, a Subzone is determined 760, Ending 765 the steps of the Subzone Determination.

Embodiments of system operation comprise configuration files, services, and messages. Services include two Windows® services, Location Services and Data Management Services. Configuration files exist for each of the Location Services Application Configuration file and the Data Management Application Configuration file. Messages are conveyed between devices and Location Services and between Location Services and Data Management Services.

When the Sectors and Zones are configured, an Extensible Markup Language (XML) document is created describing the Hosts and Repeaters that make up each Sector and the Zones within those sectors. Devices are given Router Media Access Control (RMAC) addresses employed in XML documents to describe system configuration. This XML file is read by the Data Management Service so that the Data Management Service will have information about the current configuration of sectors.

In embodiments, the Configuration Database includes the tables: Customer Facility, Customer Floor, Device Router, Device Grouping Sector, Device Grouping Group, and Device Grouping Zone.

Data Management Service Application Configuration

The Data Management Service Application Configuration Settings are included in the Data Management Service Application Configuration file. In embodiments, the application configuration settings for the Data Management Service comprise AutoAddTags, batteryDelta, batteryMax, batteryMin, configFilename, DebugOn, floatEqualRange, ListenPort, locationAgeOut, logLineLimit, logPath, purgeHours, SqlServerConnectString, TagPrefix, tempMax, tempMin, and xmlPath. Specifically, when AutoAddTags is set to True, tags that are not in, for example, the Project mobile biomedical asset table will be automatically added when a location message is received from the Location Service. If set to False, location messages will be ignored for tags that are not in the database. The Data Management Service logs changes in battery voltage greater than the battery Delta configuration setting. Battery voltage changes are logged to the TagVoltageChanges table in the ProjectInsight™ database. BatteryMax is the maximum value for the battery voltage; values above this amount are ignored. BatteryMin is the minimum value for the battery voltage; values below this amount are ignored. Continuing with embodiments, ConfigFilename is name of the XML file that describes the sector/zone configuration. When DebugOn is set to True, a debug log file will be created and messages will be logged to this file during run time. The file will be located in the directory that is set as the logPath. The FloatEqualRange value is used to determine if two floating point numbers are to be considered "equal" or equivalent. This is used when comparing the signal strength values of a tag when read by two or more devices. The value is plus or minus; therefore a value of 3 will have a range of ±3.0. ListenPort is the network port on which the service will listen for messages from the Location Service. LocationAgeOut is the number of seconds that the Data Management Service will use to determine if a tag is "Out of Network". LogLineLimit is the limit for the number of lines in a log file before creating a new file. LogPath is the directory in which log files will be created. PurgeHours is the amount of time values are kept in the AssetLocationLog before purging. SqlServerConnectString is the connection string to use to access the ProjectInsight™ database. TagPrefix is used if AutoAddTags is set to true. The ProductName field of the moblieBiomedAsset table is automatically set to the value of this setting followed by the last 3 bytes of the tag's MAC address with Hex numbers capitalized. TempMax is the maximum value for an ambient temperature reading; values above this amount are ignored. TempMin is the minimum value for an ambient temperature reading; values below this amount are ignored. XmlPath is the name of the XML file that describes the sector/zone configuration.

Location Services

The Location Services read the logical Sector/Zone configuration from a database. The Location Services model that logical Sector/Zone configuration and process tag received field strength messages, voltage messages and ambient temperature messages from the Hosts and Repeaters. When the signals from a Tag are read at the Location Service, those values are compared and the Zone with the strongest signals is used to determine the location. Once the Zone is determined, the signals are compared and the zone is further subdivided into Subzones. Then the Location Service sends the Sector/Zone/Sub Zone information to the Data Management Service. The Data Management Service translates the Sector/Zone/Sub Zone to a room location and updates the database that is used by a project management application such as the Project Insight™ web application.

Location Service Application Configuration

For embodiments, the Location Service Application Configuration Settings are included in the Location Service Application Configuration file. A Microsoft.net XML Application Configuration file is automatically generated when the application is built. The file can be used to set configurable parameters for the application. In embodiments, the application configuration settings for the Location Service comprise DebugOn, FloorID, ListenPort, LocateSleep, logLineLimit, logPath, relayAddrList, SendIP, SendPort, and SqlServerConnectString. Specifically, when DebugOn is set to True, a debug log file will be created and messages will be logged to this file during run time. FloorID is the FloorID from the Customer.Floor table in the Config database and this is the floor for which this instance of the Location Service will run. ListenPort is the network port on which the service will listen for the messages from the devices. LocateSleep is the number of milliseconds the location thread will sleep before checking the message buffer for tag field strength messages. LogLineLimit is the limit for the number of lines allowable in a log file before creating a new file. LogPath is the directory where log files will be created. RelayAddrList is a list of IP addresses and Ports to which the messages from the devices are sent. SendIP is the IP Address of the Data Management Service. SendPort is the Port on which the Data Management Service is listening. SqlServeConnectString is the connection string to use to access the airPointeConfig database.

Location Service Messages

In embodiments, device to Location Service Messages communicate Tag information within the system. The Hosts and Repeaters are programmed with the IP address of the Location Server. The Location Service listens on a port for messages from all of the Hosts and Repeaters. The message comprises Router MAC, Router Type, Tag MAC, Tag Type, Packet Type, Sequence Number, Host TX Power, Host Field Strength Measured by the Tag, Tag TX Power, Tag Field Strength Measured by the Host, and Host MAC. The Location Service looks at message types, for example: Tag Field Strength Query, Tag Voltage and Tag Ambient Temperature. The Tag voltage and tag ambient temperature data is forwarded to the Data Management Services. The Tag Field Strength messages are stored in a buffer for a configurable amount of time and then processed by the Location Algorithm where tag location is determined and the Data Management Service updates the current location of the tag in the Project Insight™ project management database.

In embodiments, Location Service to Data Management Service Messages include the Tag Location, Battery Voltage, Ambient Temperature, Field Strength to Host, Unplaced Tag, and Tag Proximity. The Tag Location Message is sent when the tag can be located to a particular Sector/Zone. Battery voltage, Ambient Temperature, and Field Strength to Host messages are converted and sent to the Data Management Service. The Unplaced Tag Message is sent to the Data Management Service when the readings for that Tag could not be located to a particular Sector/Zone. The Data Management Service then can use subzone & override rules to place the tag in a location if a match is found. The Tag Proximity Message is sent when the Tag can be located to a particular Sector/Zone.

Location Mechanism

In embodiments, the location placement mechanism uses threshold settings on the Hosts to ensure that Tags are associated with the correct sector. It also includes configuration of sectors/zones/sub zones and assignment of sectors/zones/sub zones into room locations. The location placement mechanism is divided between the Location Service and the Data Management Service. In general, the Location Service determines what sector and zone the tag is 'in'. It sends this to the Data Management Service in the Tag Location Message along with the field strength readings for the Host and the two Repeaters that make up the zone. The Location Service listens for messages and then groups them based on TagID. It sorts them in order of strongest field strength to weakest. Then it traverses the list to find the first zone match within the sector (the zone with the strongest readings). Once this is done, it sends the Tag Location Message on to the Data Management Service. The Data Management Service is configured with key fields that map from Sector/Zone/Subzone to Location Name. An example mapping would be: 0xB305 OR7. This mapping means that Sector 0xB, Zone 0x3 Sub Zone 0x5 maps to the location operating room 7 (OR7).

When the Data Management Service receives the Tag Location Message, it uses the three field strength values to determine in which Sub Zone the tag will be placed. It compares the three field strength values and, based on those comparisons, places the tag in the appropriate Sub Zone. Since the comparisons are made using floating point dBm values, a configurable range is used to determine if the values are approximately equal. The default range is ±5.0 dBm.

The Data Management Service can be configured to override the sub zone calculation described above and place the tag in a pre-defined location if the field strength values of the device in the Zone fall within certain dBm ranges. For example, a rule can be created that says if a Tag Location Message is received for Sector 1 Zone 3 and the tag to host dBm value is between −47 and −61 and the dBm value read by Repeater 1 is between −33 and −53 and the dBm value read by Repeater 2 is between −29 and −39, then place the tag in operating room 1 (OR-1). In embodiments, these rules are configured and written to the XML configuration file. The Data Management Service can be configured to place tags in a specific location if the dBm values in the Unplaced Tag Messages fall within certain ranges. For example, a rule can be created that says if the Data Management Service receives an Unplaced Tag Message for readers A, B, C and D and the dBm reading for A is between −32 and −36 and the dBm reading for B is between −42 and −52 and the dBm reading for C is between −25 and −45 and the dBm value D is between −63 and −67 then place the tag in Operating Room-22 (OR-22). In embodiments, these rules are configured and written to the XML configuration file.

When a Host is configured as a "Proximity Device" (i.e. the ProximityDevice flag is set to true in the Device.Router table), the Data Management Service can be configured to assign tags that show up on that Proximity Device Host to a specific location. For embodiments, these rules are configured and written to the XML configuration file.

Figure 8:
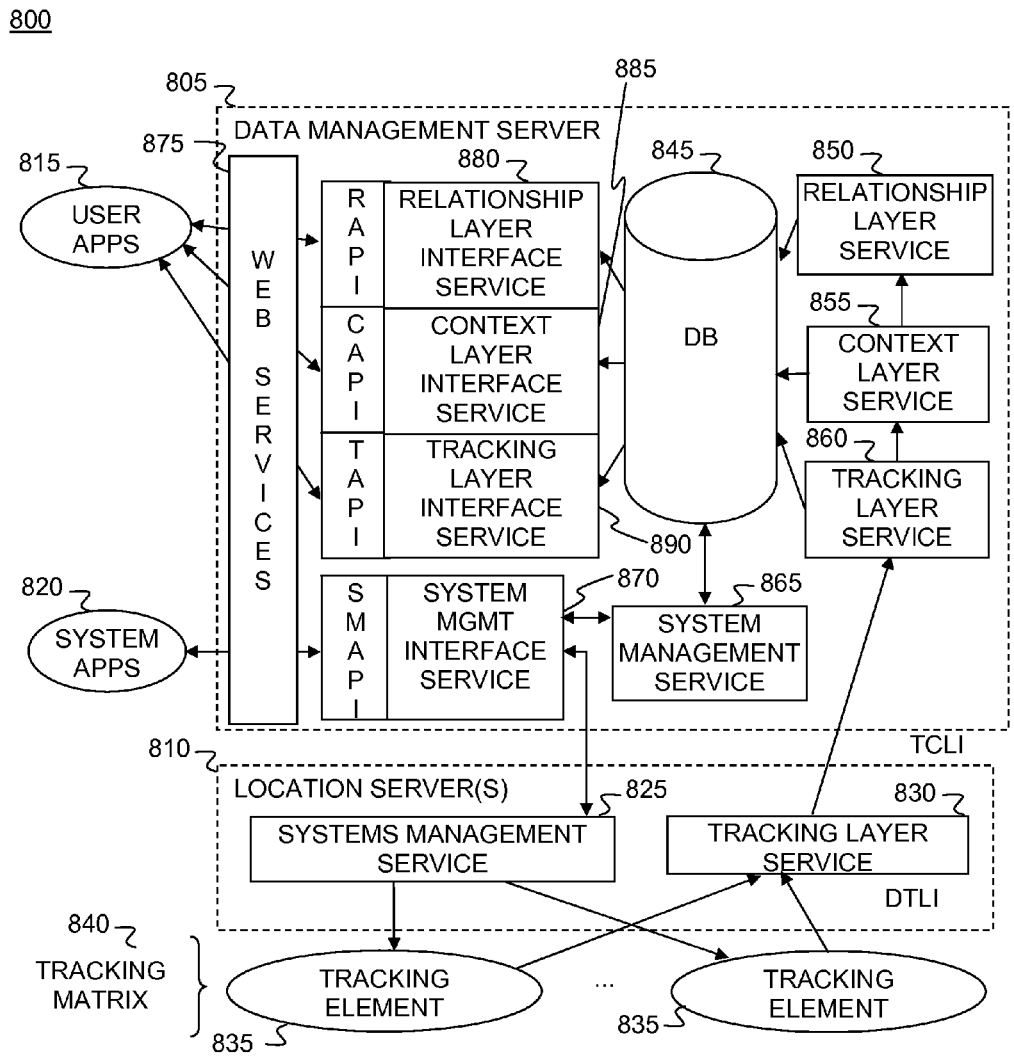
FIG. 8 is a depiction of system architecture components configured in accordance with one embodiment.

FIG. 8 depicts components of a position location system 800 configured in accordance with an embodiment of the present invention. Data Management Server 805 interfaces with Location Server(s) 810, User Applications 815 and System Applications 820. Location Server(s) 810 includes Systems Management Service 825 and Tracking Layer Service 830. Tracking Elements 835 comprise Tracking Matrix 840. Tracking Elements 835 interface with these services of Location Server(s) 810 by Device-Tracking Layer Interface (DTLI). Location Server(s) 810 communicates with Data Management Server 805 by Tracking-Context Layer Interface (TCLI). Database 845 receives input from Relationship Layer Service 850, Context Layer Service 855, Tracking Layer Service 860, and System Management Service 865. System Management Service 865 communicates with System Management Interface Service 870. System Management Interface Service 870 communicates with System Applications through Web Services 875 via System Management Application Programming Interface (SMAPI). Database 845 supplies Relationship Layer Interface Service 880, Context Layer Interface Service 885, and Tracking Layer Interface Service 890. Relationship Layer Interface Service 880 communicates with User Applications 815 through Web Services 875 via Relationship Application Programming Interface (RAPI). Context Layer Interface Service 885 communicates with User Applications through Web Services 875 via Context Application Programming Interface (CAPI). Tracking Layer Interface Service 890 communicates with User Applications 815 through Web Services 875 via Tracking Application Programming Interface (TAPI).

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for object location tracking within a field region comprising:
   at least one tag associated with an object;
   at least one host, wherein said at least one host determines attributes of field generated by at least one of said at least one tag and said at least one host, whereby location of said at least one tag in said field region is determined from said attributes;
   wherein said object location tracking comprises mapping said field region;
   wherein said mapping comprises field parameters; and
   wherein said mapped field parameters comprise tag to host Received Signal Strength Indication (RSSI) and host to tag RSSI.

2. The system of claim 1, further comprising:
   at least one repeater, wherein at least one of said at least one repeater and said at least one host determines attributes of field generated by at least one of said at least one tag, said at least one host, and said at least one repeater, and wherein said at least one repeater is in communication with said at least one host, whereby location of said at least one tag in said field region is determined from said attributes.

3. The system of claim 1, wherein said location determination comprises three spatial dimensions.

4. The system of claim 1, wherein said field region comprises at least one sector comprising at least one group, and said at least one group comprises at least one zone comprising at least one subzone.

5. The system of claim 1, wherein object said location determination comprises rules, wherein said rules comprise overrides to adapt to environment and object attributes.

6. The system of claim 1, wherein said location determination comprises assigning a tag to a specific location when said tag is associated with a host, wherein said host is configured as a proximity device.

7. The system of claim 1, wherein environment attributes and object attributes are communicated, comprising:
   messages, wherein said messages comprise at least one of: tag location, battery voltage, ambient temperature, RF strength from host, unplaced tag, and tag proximity.

8. The system of claim 1, wherein an asset table is updated by asset tag appearance.

9. The system of claim 1, wherein object tracking comprises thresholds whereby efficiency is increased.

10. A method for tracking objects comprising the steps of:
    measuring field attributes of a region;
    identifying at least one object from said measured attributes;
    determining at least a location of said object from said measured attributes; and
    calibrating to determine said attributes of said field of said region whereby said field of said region is mapped for attributes.

11. The method of claim 10, wherein field regions are mapped to define locations.

12. The method of claim 10, wherein said attributes comprise RF field attributes for a location.

13. The method of claim 10, wherein location resolution is configurable, providing enhanced accuracy and speed.

14. The method of claim 10, wherein said at least one object is sorted by object parameters.

15. The method of claim 10, wherein said step of determining at least a location of said object comprises a configurable sleep time defining message check frequency whereby efficiency is increased.

16. A system for object tracking within a field region comprising:
    at least one object comprising at least one tag;
    at least one host; and
    at least one repeater, wherein said at least one repeater determines attributes of a field generated by said at least one object comprising at least one tag and is in communication with said at least one host, whereby a three-dimensional spatial location of said at least one object in said field region is determined from said attributes, wherein false location messages are ignored for said tags not in attribute database, field mapping attributes comprise Extensible Markup Language (XML) documents, and said object tracking comprises out of network information, purge time, and configurable sleep time defining message check frequency whereby efficiency is increased.

* * * * *